(12) United States Patent
Kobayashi et al.

(10) Patent No.: US 6,700,251 B2
(45) Date of Patent: Mar. 2, 2004

(54) VIBRATING DEVICE FOR AXIALLY VIBRATING A MOVABLE MEMBER

(75) Inventors: Takashi Kobayashi, Yamanashi-ken (JP); Masaki Tohyama, Yamanashi-ken (JP); Kenshi Aihara, Yamanashi-ken (JP); Akira Nikaido, Tokyo (JP); Kazumi Miyamoto, Yamanashi-ken (JP); Naoki Miura, Yamanashi-ken (JP)

(73) Assignee: Citizen Electronics Co., Ltd., Yamanashi-ken (JP)

( * ) Notice: Subject to any disclaimer, the term of this patent is extended or adjusted under 35 U.S.C. 154(b) by 0 days.

(21) Appl. No.: 10/282,232

(22) Filed: Oct. 29, 2002

(65) Prior Publication Data

US 2003/0164647 A1 Sep. 4, 2003

(30) Foreign Application Priority Data

Nov. 6, 2001 (JP) .......................... 2001-341285
Jan. 23, 2002 (JP) .......................... 2002-014894

(51) Int. Cl.$^7$ ................................ H02K 7/06
(52) U.S. Cl. .................. 310/81; 310/15; 310/23; 310/27
(58) Field of Search ................ 310/81, 31, 12, 310/13, 15, 17, 20, 23, 27

(56) References Cited

U.S. PATENT DOCUMENTS

| 5,903,076 | A | * | 5/1999 | Suyama | 310/81 |
| 6,268,671 | B1 | * | 7/2001 | Furuki | 310/81 |
| 6,404,085 | B2 | * | 6/2002 | Hamaguchi et al. | 310/81 |
| 6,486,579 | B1 | * | 11/2002 | Furuya et al. | 310/81 |
| 2001/0030474 | A1 | * | 10/2001 | Sakai et al. | 310/81 |
| 2002/0089247 | A1 | * | 7/2002 | Ibata et al. | 310/81 |

* cited by examiner

*Primary Examiner*—Thanh Lam
(74) *Attorney, Agent, or Firm*—Dennison, Schultz, Dougherty & MacDonald

(57) ABSTRACT

A cup-shaped yoke is axially movably provided in a cylindrical frame, and a cylindrical permanent magnet is securely provided in the yoke. A coil bobbin is cantilevered in the frame and inserted in a space between the yoke and the permanent magnet, and a driving coil is mounted on the coil bobbin. The yoke is held by a pair of coil springs for resiliently holding the yoke in the frame.

7 Claims, 5 Drawing Sheets

VIBRATING DEVICE FOR AXIALLY VIBRATING A MOVABLE MEMBER

BACKGROUND OF THE INVENTION

The present invention relates to a vibrating device having an axially driven movable member, and more particularly to a vibrating device mounted in a portable telephone for signaling a user by vibration of the movable member.

In recent years, there is popularized various portable instruments such as portable telephone, PDA (Personal Digital Assistant), wearable computing instruments and so forth. In these instruments, vibrating devices are mounted for informing signals, by vibration without producing sounds.

FIG. 6 is a perspective view showing a conventional vibration device disclosed in Japanese Patent Laid Open 7-107699. A direct current motor 131 has a rotating shaft 136 supported by a bearing 133. There is formed an annular groove 135 on which an eccentric weight 134 is secured by a fixer 140.

In such a motor, since a commutator and a brush assembly are provided, or manufacturing cost increases. It takes a time before the rotating speed approaches 7000~8000 rpm. Therefore, the device is improper to a device which vibrates in accordance with a music signal. Furthermore, arcs generated between the commutator and brushes cause the quality and the life of the motor to reduce.

SUMMARY OF THE INVENTION

An object of the present invention is to provide a vibrating device which may be manufactured at a low cost and has a high performance.

According to the present invention, there is provided a vibrating device comprising an axially elongated frame, a hollow yoke having an axially elongated shape and an opening at an end thereof, and axially movably provided in the frame, a cylindrical permanent magnet securely provided in the yoke, a coil bobbin cantilevered in the frame and having an end portion inserted in the yoke from the opening and in a space between the yoke and the permanent magnet, a driving coil mounted on the coil bobbin, at least one coil spring provided for resiliently holding the yoke in the frame.

The yoke has a hollow cylindrical form, and the yoke has a cup shape.

At least one weight is secured to a bottom of the yoke.

A plurality of guide projections are provided on an inside wall of the frame for movably supporting the yoke.

A pole piece made of magnetic material is secured to an end of the permanent magnet.

The device further comprises a plurality of axial grooves in each of which the guide projection is axially movably engaged.

These and other objects and features of the present invention will become more apparent from the following detailed description with reference to the accompanying drawings.

DETAILED DESCRIPTION OF THE PREFERRED EMBODIMENT

Figure 1:
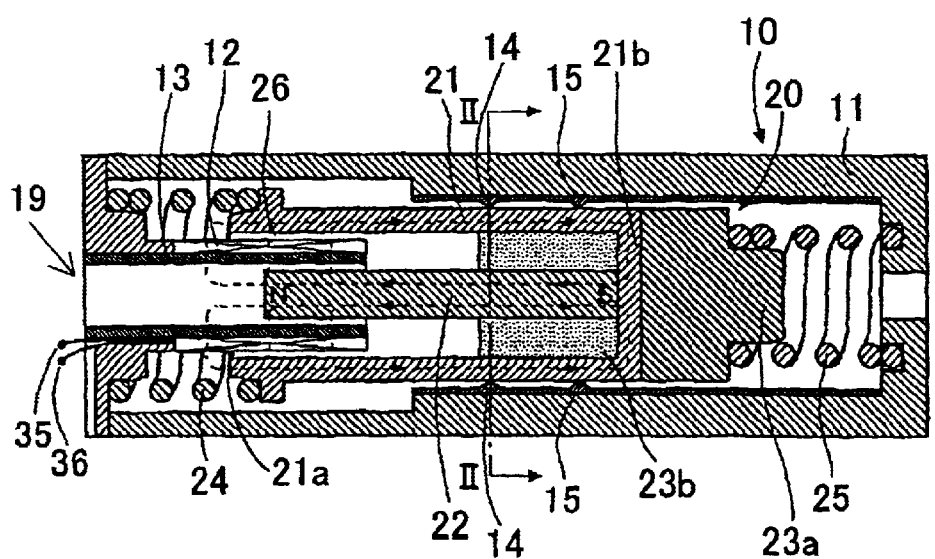
FIG. 1 is a sectional side view showing a first embodiment of the present invention.
Figure 2:
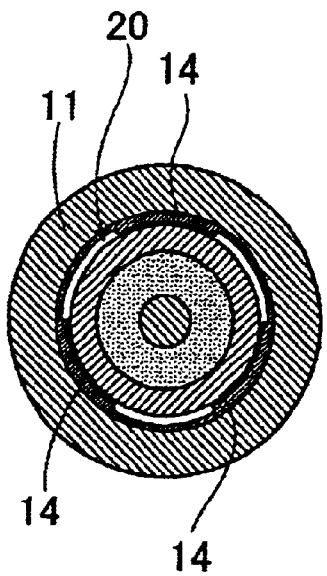
FIG. 2 is a sectional view taken along a line II—II of FIG. 1.

FIG. 1 is a sectional side view showing a first embodiment of the present invention, FIG. 2 is a sectional view taken along a line II—II of FIG. 1.

The vibrating device 10 of the present invention comprises a cylindrical frame 11 made of a resin, a vibrating assembly 20 axially movably mounted in the frame 11, and a magnetic driving device 19 mounted in the frame 11 at an end thereof.

The vibrating assembly 20 comprises a cup-shaped yoke 21 having an opening 21a at an end and a bottom 21b at the other end, a cylindrical permanent magnet 22 secured to the yoke 21 at the axis thereof, and a pair of weights 23a and 23b secured to the outside and inside of the bottom 21b of the yoke 21. The yoke 21 is slidably supported by two rows and three projections 14 and 15 formed on the inside wall of the frame 11, so that the vibrating assembly 20 can be smoothly vibrated.

The vibrating assembly 20 is resiliently held at a neutral position by a pair of coil springs 24 and 25 provided between both axial ends and the frame 11.

The magnetic driving device 19 comprises a coil bobbin 13 cantilevered in the end of the frame 11 and a driving coil 12 provided on the coil bobbin 13. The coil bobbin 13 is made of a metal pipe, on the peripheral surface of which is formed an insulation layer. The coil bobbin 13 is inserted in a space 26 between the yoke 21 and the permanent magnet 22.

The primary resonance frequency of the vibrating assembly 20 is 100~160 Hz, the vibration at which is properly transmitted to the user's body. An alternating signal having a basic frequency of the primary resonance frequency is applied to the driving coil 12 from terminals 35 and 36, so that the vibrating assembly 20 is axially vibrated.

Figure 5:
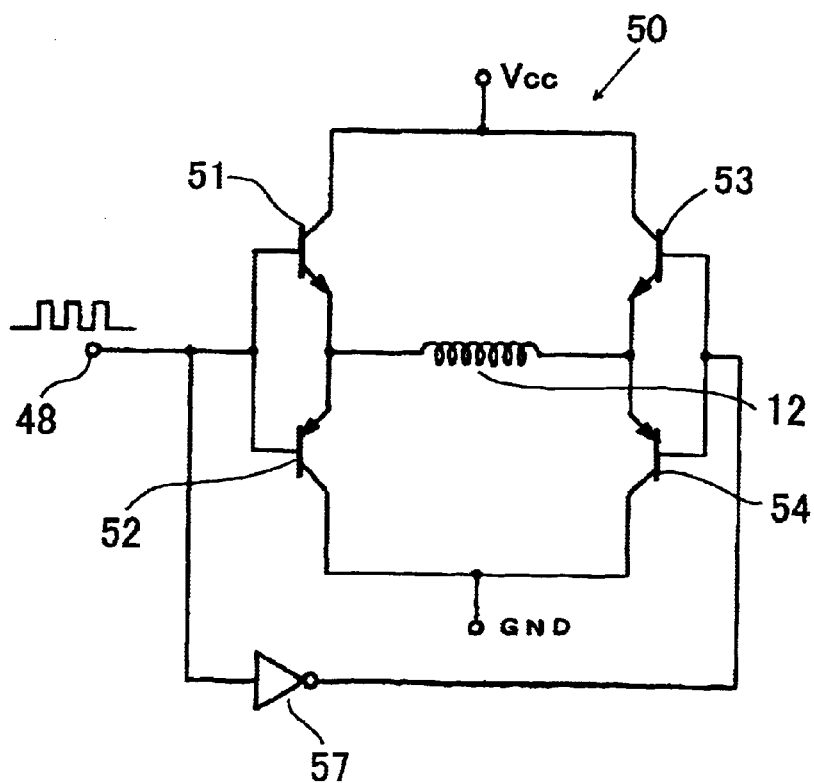
FIG. 5 is driving circuit for driving the device.

FIG. 5 is a driving circuit for driving the vibrating device.

In operation, when a low frequency signal of about 100 –300 Hz is applied to input terminal 48 of the driving circuit 50, the transistors 51 and 54 are turned on at a high level of the input signal. Consequently, a current passes the driving coil 12 through the transistors 51 and 54 from the Vcc to GND. And the current passes through the transistor 53, coil 12 and transistor 52 at a low level of the input signal. Thus, an alternating current of the low frequency corresponding to the input low frequency signal flows in the coil 12. Consequently, the vibrating assembly 20 is axially vibrated.

Although two coil springs 24 and 25 are provided in the above described embodiment, only one coil spring may be used to urge the vibrating assembly 20 in a direction. In such a case, the vibrating assembly 20 is pressed against a cushion. In addition, although each of the frame 11 and the vibrating assembly has an annular sectional shape, other shapes such as a rectangular sectional shape may be used.

Figure 3:
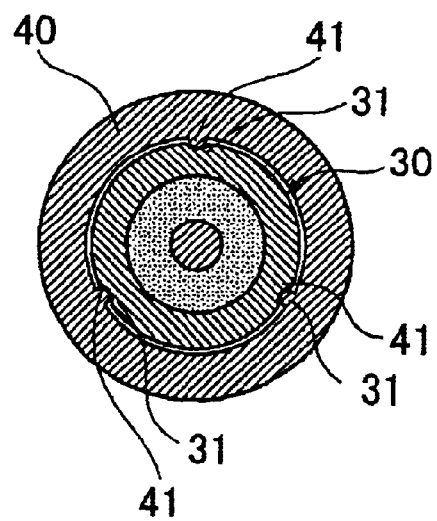
FIG. 3 is a sectional view of a second embodiment of the present invention.

FIG. 3 is a sectional view of a second embodiment of the present invention. There is provided three axial guide ribs 41 in the inside wall of a frame 40, and three axial guide grooves 31 in the peripheral wall of a yoke 31, with each of which the guide rib 41 is slidably engaged. Thus, a vibrating assembly 30 is smoothly vibrated without pitching, rolling and yawing.

Figure 4:
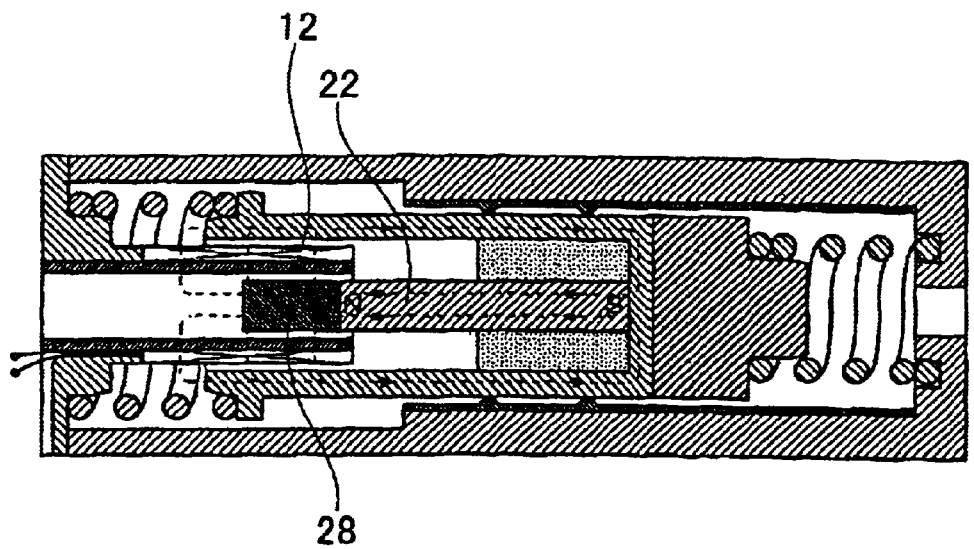
FIG. 4 is a sectional side view showing a third embodiment of the present invention.

Referring to FIG. 4 showing a third embodiment of the present invention, a cylindrical pole piece 28 made of magnetic material is secured to the end of the permanent magnet 22. In the device, distribution of magnetic flux from the pole piece 28 expands in the radial direction of the driving coil 12. Consequently, the number of magnetic flux crosses in the driving coil 12 largely increases, thereby increasing converting efficiency to vibrating energy.

In the above described embodiments, although the yoke 21 has a cup-shape and the permanent magnet 22 is cylindrical, a cup-shaped permanent magnet and a cylindrical yoke may be used.

Figure 6:
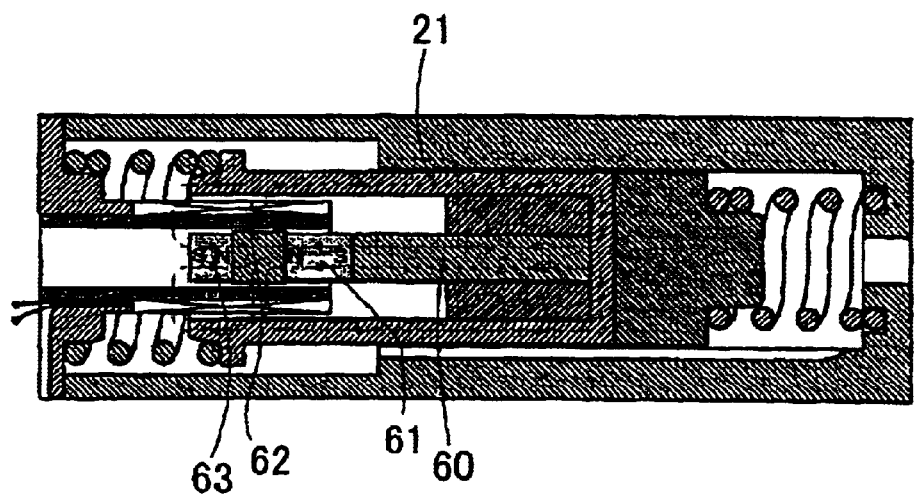
FIG. 6 is a sectional side view showing a fourth embodiment of the present invention.

Referring to FIG. 6 showing the fourth embodiment, a center yoke 60 is secured to the bottom of the yoke 21. A first permanent magnet 61 and a second permanent magnet 63 are secured to each other, interposing a pole piece 62. Each of the first and second permanent magnets has the same polarity.

Figure 7:
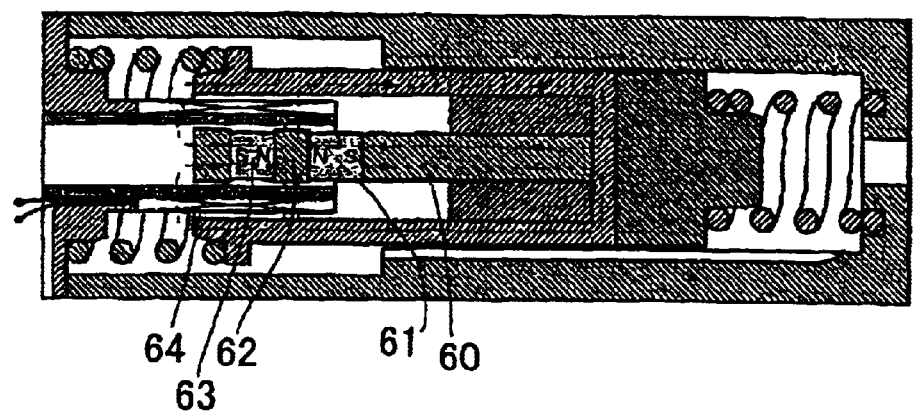
FIG. 7 is a sectional side view showing a fifth embodiment of the present invention.
Figure 8:
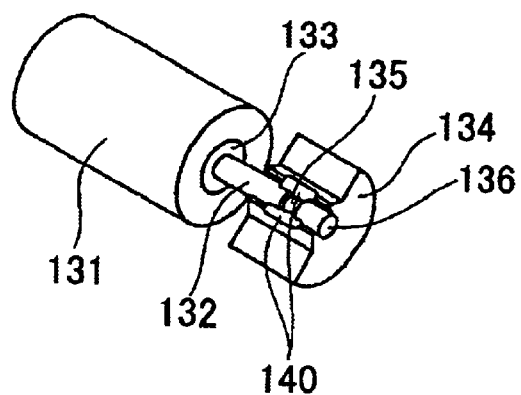
FIG. 8 is a perspective view showing a conventional vibration device.

In the fifth embodiment shown in FIG. 7, an end center yoke 64 is further secured to the second permanent magnet 63.

In accordance with the present invention, the vibrating device is simple in construction and hence can be manufactured at a low cost, and has high quality.

While the invention has been described in conjunction with preferred specific embodiment thereof, it will be understood that this description is intended to illustrate and not limit the scope of the invention, which is defined by the following claims.

What is claimed is:

1. A vibrating device comprising:

an axially elongated frame;

a hollow yoke having an axially elongated shape and an opening at an end thereof, and axially movably provided in the frame;

at least one permanent magnet securely provided in the yoke;

a coil bobbin cantilevered in the frame and having an end portion inserted in the yoke from the opening and in a space between the yoke and the permanent magnet;

a driving coil mounted on the coil bobbin; and at least one spring provided for resiliently holding the yoke in the frame.

2. The device according to claim 1 wherein the yoke has a hollow cylindrical form, and the yoke has a cup shape.

3. The device according to claim 2 further comprising at least one weight secured to a bottom of the yoke.

4. The device according to claim 2 further comprising a plurality of guide projections provided on an inside wall of the frame for movably supporting the yoke.

5. The device according to claim 4 further comprising a plurality of axial grooves in each of which the guide projection is axially movably engaged.

6. The device according to claim 2 further comprising a pole piece made of magnetic material and secured to an end of the permanent magnet.

7. The device according to claim 2 further comprising a center yoke secured to a bottom of the yoke, the permanent magnet is secured to the end of the center yoke.

* * * * *